June 13, 1939. M. C. REYNOLDS 2,162,316
METHOD OF TREATING LIQUID EGG MATERIAL
Filed Jan. 28, 1935
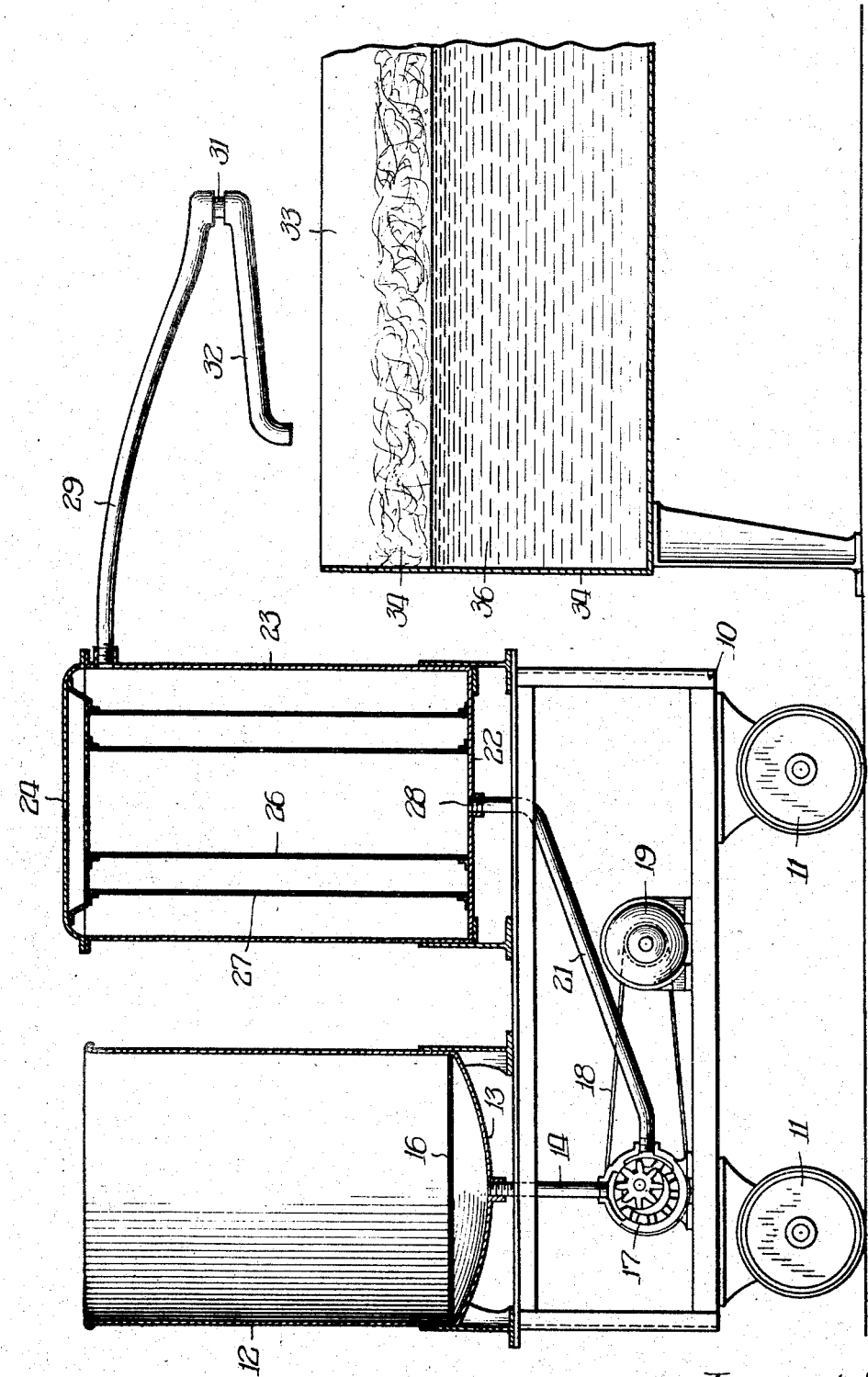
Inventor:
Marvin C. Reynolds,
By John J. McLaughlin
atty Patented June 13, 1939

2,162,316

UNITED STATES PATENT OFFICE 2,162,316

METHOD OF TREATING LIQUID EGG MATERIAL

Marvin C. Reynolds, Chicago, Ill.; Lulu E. Reynolds and First National Bank of Chicago, executors of said Marvin C. Reynolds, deceased, assignors to The Emulsol Corporation, Chicago, Ill., a corporation of Illinois Application January 28, 1935, Serial No. 3,770

2 Claims. (Cl. 99—210)

My invention relates to the treatment of eggs preparatory to processing them. It relates more in particular to an improved method of and means for treating egg whites as a step in the process of drying them.

In the industries having to do with the preparation and use of products prepared from egg meat (which may be the yolks, whites, or mixed yolks and whites), many different processes have been employed and it has been found that comparatively minor variations in the steps of a process will have a very important result upon the character of the product finally produced. My present invention relates to a treatment adapted to be used on various types of egg products, but has its greatest utility and advantage in the preparation of egg whites preparatory to drying them. The process will be described, therefore, as it relates to work on egg whites.

It is now well known that if liquid egg whites are subjected to a controlled fermentation, in the manner described in Patent No. 1,818,212, for example, improved results are imparted to the final dried product, particularly that the dried egg whites, when hydrated, will have better foaming qualities and be superior in other respects. I have found that egg whites without previous treatment will not ferment uniformly. The relatively more viscous portions will not be affected before the relatively thinner portions of the whites have become over-fermented, and more or less deteriorated. Indeed, almost one-third of the egg whites in a fermentation tank or vat will be found to be affected only slightly by the action of the bacteria, and this portion will form a relatively heavy layer at the top of the tank. First class dried egg whites cannot be produced with this relatively heavy portion and so there is an appreciable loss if a high grade dried albumen is to be produced. It has been assumed that if this relatively heavy portion of the egg whites were broken up, fermentation would take place uniformly throughout the entire mass and a greater yield of a high grade product would be obtained. For this reason, it has been suggested that the egg whites be ground in order to produce a uniform product, but I have found that even grinding according to improved patented methods will not produce the desired result, and the egg whites will still contain a relatively large amount of substantially heavy and viscous product after they have been subjected to controlled fermentation.

The object of my invention is the production of an improved method of and means for treating liquid egg products.

Another object is the provision of an improved method for treating egg whites preparatory to drying them.

Other specific objects and features of the invention will be apparent as the description progresses.

For the convenience of those skilled in the art, I show a single sheet of drawings illustrating the apparatus, and illustrating in part the process employed in my invention.

I have discovered that if egg whites be filtered under pressure (preferably with a rotary, positive action pump) through a relatively fine screen of relatively large area, such liquid egg whites will be substantially uniform. Further, when the egg whites, filtered in the manner described, are subjected to fermentation, a very large proportion will be affected by the bacteria and the proportion of relatively heavy viscous substance will be extremely small, amounting to from 5% to 8% only of the total product. The difference in the product may be understood by a reference to actual operations. In a relatively large fermenting vat or tank in which a relatively heavy viscous product will comprise a layer of eight or more inches at the top if the egg whites are untreated, only approximately two inches of the top will comprise the relatively viscous portion when my improved process is employed. Moreover, the dry product will be superior when my process is employed, not only from the standpoint of beating qualities and the like, but it will be cleaner, more uniform, and of higher grade generally.

Referring now to the drawing, I show a frame 10 mounted on wheels 11 which will permit the entire assembly to be moved at will about an egg breaking and packing plant. The liquid egg material is delivered by suitable means to a receptacle 12 having an arcuate shaped bottom 13 so as to deliver all of the liquid egg product to an outlet pipe 14. A screen 16 of relatively heavy mesh is provided for removing any large pieces of foreign matter that may find their way to the receptacle 12. On a lower portion of the frame, I provide a positive acting rotary type of pump 17. This is preferably a type of pump known as a "Viking" pump, well known in the industries. The pump is driven by a belt 18 from an electric motor 19 or other suitable source of power. The pump receives the liquid egg material through the pipe 14 and delivers the liquid egg material through an exhaust port to a delivery pipe 21.

On the upper portion of the frame 10, I mount a strainer apparatus having a bottom 22, a cylindrical side wall 23 and a removable cover 24. A pair of cylindrical screens 26 and 27 are disposed axially of each other and axially of the casing 23. These screens are sealed against the bottom 22 and at the top are sealed by the cover 24. Suitable means such as gaskets are provided to afford a tight connection at the ends of the screens, the screens however being readily removed when the cover 24 is opened, in order that they may be cleaned or replaced.

The pipe 21 is connected through inlet 28 to the interior of the inner screen 26. The liquid egg material is forced under pressure through screen 26 and thence through screen 27, and is delivered to an outlet pipe 29 threaded into a boss provided on the outside casing 23 of the screen apparatus. A swivel joint 31 connects pipe 29 to a spout or pipe 32, whereby the liquid egg material may be delivered readily to a vat or tank 33. I show the vat 33 in the form of a usual type of fermenting vat usually employed for fermenting egg whites before drying.

The screens 26 and 27 are not required to be of any particular mesh in order to secure good results; but screen 26 is preferably of closer mesh than screen 27. I have found that I secure exceptionally good results, however, if screen 26 has about twenty-five meshes per inch and screen 27 has about forty meshes per inch. In actual operation, the apparatus functions best to produce the desired result after the screens have been operated long enough to accumulate a coating of relatively heavy and large sized material which will not pass through the fine mesh. This condition occurs after only a very short operation, but thereafter the apparatus can be operated for a comparatively long period of time without appreciable increase in the coating on the screens and without causing a stoppage. The screen 26 continues to screen out and trap foreign materials such as small pieces of egg shells and the like together with portions of the egg whites which are not readily broken up by pressure against the screen. The screen 27, therefore, receives a cleaner and much more subdivided product, but it also filters out foreign material and insoluble portions of chalazae and the like which may have passed screen 26.

I have found that it is very important for the carrying out of my process to have ample screen surface. This not only permits the apparatus to be run for a longer period of time without cleaning, but permits also of the building up of a mat on the screens, thereby improving the filtering without undue increase of pressure.

In tank 33 I have indicated, more or less schematically, a batch of liquid egg whites on which the fermentation has been carried out so that the egg whites are ready to be dried. It will be noted that there is only a relatively thin upper layer 34, while the bottom layer 36 of high grade egg whites represents by far the major proportion of the product. All of the layer 36 can be dried to produce a very high grade dried albumen, which can be marketed in flake or granular form. The upper portion 34, which is relatively much heavier and more viscous than the lower portion, can also be dried up. This is not of the high quality of the lower portion, but is of better quality than if the whites had not been treated.

It must not be assumed that my apparatus and process are applicable only to the treatment of liquid egg whites as a step in the drying thereof. Egg yolks can be treated in the same manner and then processed in the manner described in Epstein Patent No. 1,730,879 and an improved salt yolk product is produced. Liquid whole eggs can also be processed in the same manner, with the result that a much better mixture of yolks and whites is obtained and the product will be superior in many respects to products processed without the use of my improved treatment.

What I claim as new and desire to protect by Letters Patent of the United States is:

1. The method of producing improved dried egg white of substantially uniform character and without substantial wastage which comprises forcing liquid egg whites under pressure through a fine mesh screen, subjecting the resulting screened product to controlled fermentation whereby substantially all of the liquid egg whites undergo uniform fermentation, and then drying the resulting fermented product.

2. The method of producing improved dried egg white of substantially uniform character and without substantial wastage which comprises continuously withdrawing liquid egg whites from a container and into a positively acting rotary pump, delivering the egg whites under pressure of said pump through a relatively large area fine mesh screen, subjecting the screened product to a controlled fermentation whereby substantially all of the liquid egg whites undergo uniform fermentation, and then drying the resulting fermented product.

MARVIN C. REYNOLDS.